United States Patent [19]

Moser et al.

[11] Patent Number: 5,400,196
[45] Date of Patent: Mar. 21, 1995

[54] DASD WITH SPINDLE IMBALANCE ISOLATION AND METHOD FOR PRODUCING SAME

[75] Inventors: Michael A. Moser, San Jose, Calif.; Arun Sharma, New Rochelle; Muthuthamby Sri-Jayantha, Ossining, both of N.Y.

[73] Assignee: International Business Machines Corporation, Armonk, N.Y.

[21] Appl. No.: 878,191
[22] Filed: Apr. 30, 1992
[51] Int. Cl.$^6$ ............................................. G11B 33/14
[52] U.S. Cl. ................................. 360/97.02; 248/560; 248/638; 360/137
[58] Field of Search ............... 248/560, 566, 576, 581, 248/582, 583, 591, 603, 605, 614, 638, 672, 610, 913; 360/97.01, 97.02, 137; 369/75.1

[56] References Cited

U.S. PATENT DOCUMENTS

| | | |
|---|---|---|
| 4,082,005 | 4/1978 | Erdley . |
| 4,126,046 | 11/1978 | Erdley . |
| 4,190,870 | 2/1980 | Avina et al. . |
| 4,325,133 | 4/1982 | Reitmayer ..................... 248/638 X |
| 4,475,184 | 10/1984 | Cooper et al. ................ 248/560 X |
| 4,568,988 | 2/1986 | McGinlay et al. . |
| 4,596,373 | 6/1986 | Omi et al. ...................... 248/638 X |
| 4,598,328 | 7/1986 | Frangesh . |
| 4,703,470 | 10/1987 | Castagna et al. . |
| 4,705,257 | 11/1987 | Leo et al. . |
| 4,713,714 | 12/1987 | Gatti et al. . |
| 4,743,995 | 5/1988 | Castle et al. . |
| 4,812,932 | 3/1989 | Hishinuma et al. . |
| 4,831,476 | 5/1989 | Branc et al. . |
| 4,871,142 | 10/1989 | deMey, II . |
| 4,875,655 | 10/1989 | Bender et al. . |
| 4,890,174 | 12/1989 | Chalmers et al. . |
| 4,937,806 | 6/1990 | Babson et al. .................. 360/137 X |
| 4,947,093 | 8/1990 | Dunstan et al. . |
| 4,967,293 | 10/1990 | Aruga et al. . |
| 4,979,062 | 12/1990 | Stefansky et al. . |
| 5,004,207 | 4/1991 | Ishikawa et al. . |
| 5,038,239 | 8/1991 | Vettel et al. . |
| 5,058,853 | 10/1991 | Beloncik et al. . |
| 5,060,095 | 10/1991 | Rigotti et al. . |
| 5,079,655 | 1/1992 | Yagi .................................. 360/97.02 |
| 5,124,855 | 6/1992 | Dew et al. ...................... 360/137 X |
| 5,130,870 | 7/1992 | Jabbari ............................. 360/137 X |
| 5,163,038 | 11/1992 | Arai ................................... 369/75.1 X |

OTHER PUBLICATIONS

"Vibration Isolation Using Secondary Mounting Plate", by M. W. Hall, T. E. Lanham and J. D. Lipscombe, IBM Technical Disclosure Bulletin vol. 33 No. 5 Oct. 1990.

"Disk Drive Mounting", by R. J. Lindner, IBM Technical Disclosure Bulletin vol. 16 No. 3 Aug. 1973.

"Shock Mount", by S. Koshida and S. Matsuzaki, IBM Technical Disclosure Bulletin vol. 30 No. 7 Dec. 1987.

"Frictional–Elastomeric Shockmount System For Mechanical Isolation Of a Fragile Device From Sources of vibration and Shock" R. A. Rachui and G. M. Yanker IBM Technical Disclosure Bulletin vol. 33 No. 9 Feb. 1991.

*Isolation of Vibration in Spring Mounted Apparatus I*, J. N. MacDuff, Product Engineering, Jul. 1946.

*A Simplified Method for the Design of Vibration Isolating Suspensions*, Lewis & Unholtz, Dec. 1946.

Primary Examiner—Alvin C. Chin-Shue
Assistant Examiner—Derek J. Berger
Attorney, Agent, or Firm—David Aker

[57] ABSTRACT

An apparatus (and a method for producing the same) for preventing internal vibrations produced as a result of rotary motion at a predetermined frequency within a device mounted in an enclosure from being translated into resulting rotary motion of the device comprises n vibration isolation mounts located between the device and the enclosure, said vibration isolation mounts having stiffness characteristics and being positioned so that rotational motion of the device at the frequency of the rotary motion is eliminated. The vibration isolation mounts are arranged and configured so that when the rotary motion produces linear and rotational forces, the net moment of all forces about the center of gravity of the device is equal to zero. The vibration isolation mounts may be isotropic. The isolation mounts may have different stiffness's. Three or more mounts may be used. Alternatively, the vibration isolation mounts may have the same stiffness's but their positions may be varied. An additional mass may be added to change the location of the center of gravity of the device. The vibration isolation mounts are preferably comprised of a material which provides damping of approximately ten percent of critical damping.

31 Claims, 3 Drawing Sheets

FIG. 3

DASD WITH SPINDLE IMBALANCE ISOLATION AND METHOD FOR PRODUCING SAME

BACKGROUND OF THE INVENTION

1. Field of the Invention

This invention relates to direct access storage devices (DASD's). More particular, it relates to DASD's wherein a rotating storage medium interacts with a head so as to store and/or retrieve information.

2. Background Art

An important design parameter for disk drives is the number of tracks per inch (TPI) that can be repeatably read and written by the heads. The role of the head positioning servo system is to ensure that the heads follow the track within a given error. One of the leading causes of this error can be from vibration of the drive produced by the rotation of an imbalanced spindle.

Until now, significant expense and time have been devoted to balancing spindles to reduce the amplitude of this vibration. This increases cost by requiring that very precisely balanced parts be produced, or that each spindle be individually balanced, an inherently time consuming and costly procedure.

SUMMARY OF THE INVENTION

It is an object of the invention to provide a mounting arrangement which prevents internal vibrations produced as a result of rotary motion in a device mounted in an enclosure from being translated into rotary motion of the device.

It is another object of the invention to provide a mounting arrangement wherein when the rotary motion produces linear and rotational forces a net moment of all forces about the center of gravity of the device is equal to zero.

It is yet another object of the invention to provide a method for designing an apparatus wherein internal vibrations produced as a result of rotary motion at a predetermined frequency within a device are prevented from being translated into resulting rotary motion of the device.

In accordance with the invention an apparatus for preventing internal vibrations produced as a result of rotary motion at a predetermined frequency within a device mounted in an enclosure from being translated into resulting rotary motion of the device comprises n vibration isolation mounts located between the device and the enclosure, said vibration isolation mounts having stiffness characteristics and being positioned so that rotational motion of the device at the frequency of the rotary motion is eliminated. The vibration isolation mounts are arranged and configured so that when the rotary motion produces linear and rotational forces, the net moment of all forces about the center of gravity of the device is equal to zero.

The vibration isolation mounts may be isotropic. The isolation mounts may have different stiffness's. Preferably three mounts used. Alternatively, the vibration isolation mounts may have the same stiffness's but their positions may be varied. An additional mass may be added to change the location of the center of gravity of the device. The vibration isolation mounts are preferably comprised of a material which provides damping of approximately ten percent of critical damping.

The invention is also directed to a method for producing the apparatus.

DETAILED DESCRIPTION OF THE PREFERRED EMBODIMENT

Figure 1:
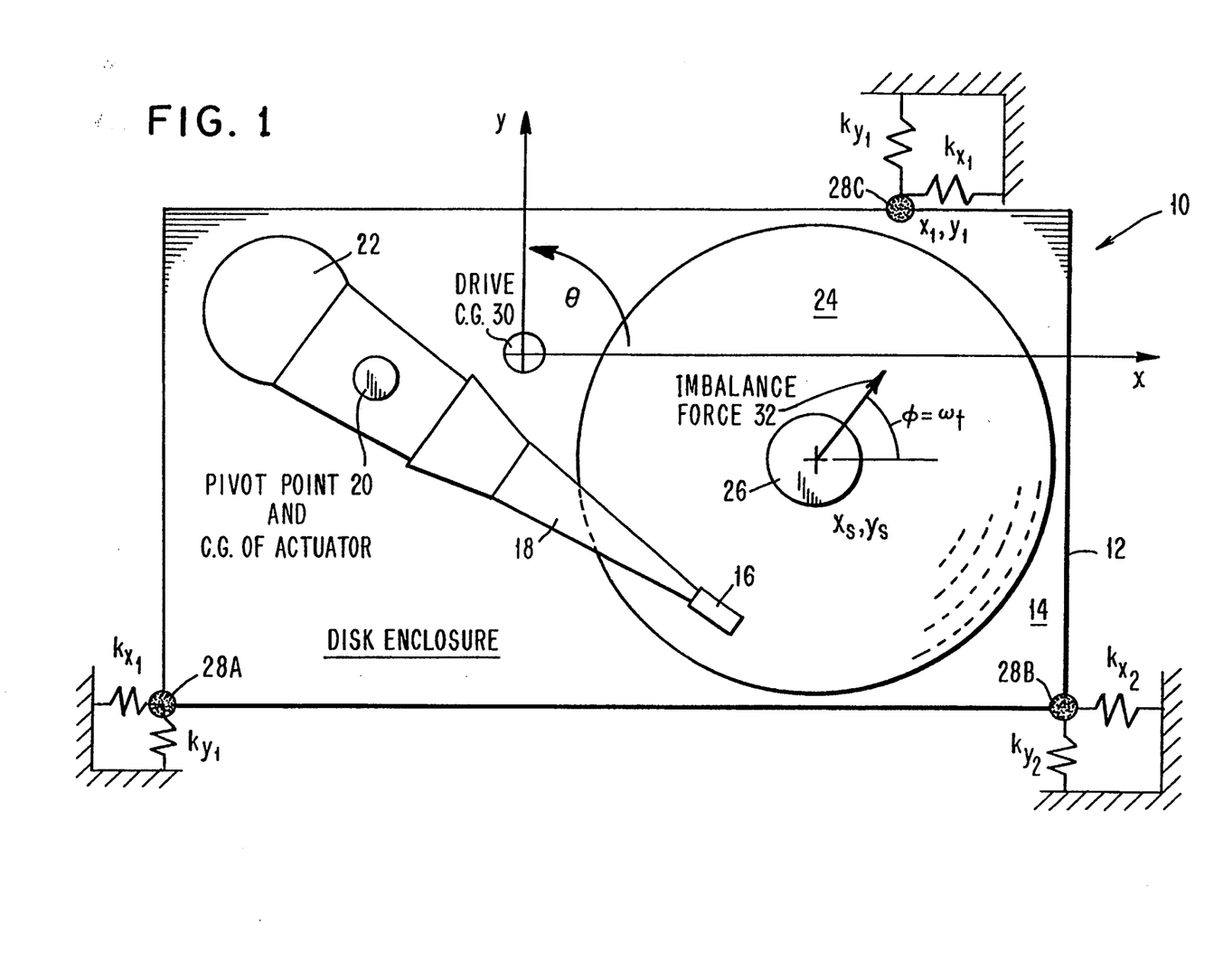
FIG. 1 is a somewhat schematic diagram of a rotary drive and its isolation system.

Referring to FIG. 1, a rotary disk drive 10 includes a housing 12 having a base 14 on which the components thereof are mounted. A head 16 is positioned at an end of an actuator 18 which rotates about a pivot point 20 under the action of a voice coil 22 of a voice coil motor. Head 16 interacts with a disk 24 mounted on a rotating spindle 26 which is rotated by a motor (not shown).

Base 14 of rotary disk drive 10 is mounted by three isolators 28a, 28b and 28c which each have an elastic constant $k_{x1}$ to $k_{x3}$ and $k_{y1}$ to $k_{y3}$ in the x and y directions, respectively. The center of gravity of rotary drive 10 in the x and y directions is located at a point 30.

The effect of an imbalanced spindle is represented by a force vector 32 rotating at the spindle rotation speed. This rotating vector can impart both translational and rotational motion into the base structure of a disk drive. Since the actuator has a balanced design (that is the center of gravity of the actuator coincides with its pivot point), the translational components of the base casting motion do not cause any rotation in the actuator, and do not cause off-track motion. The rotational motions of the base do produce rotation in the actuator, and are a source of off-track motion of the actuator. Thus, if the rotational component of the base structure motion at the rotational frequency of the spindle is eliminated, there is no coupling between a spindle imbalance and any possible off-track motion of the heads.

This present invention provides a method for producing a shock mount system that has no rotation at a prescribed frequency, in this case the frequency of rotation of the disk. Thus the shock mounts of the rotary drive are used in a manner which is different from their conventional use in isolating the drive from external vibration. The technique presented herein does not eliminate their isolation functions but instead augments it to reduce internally generated vibrations at a prescribed frequency.

The present invention contemplates three related techniques for achieving the optimal design. These include optimal positioning of a set of isolators, a proper choice of different stiffness isolators at a given set of positions, and altering the mass distribution of the system. The alternate implementations allow the method to be applied to products in various stages of development. For example, for a drive in production it is expensive to modify the base structure, and designs in which unequal shock mount stiffness's are used or masses are attached to the base casting are suitable. Conversely, for a drive in the early design stages, the use of a single type of isolators placed at optimized positions is probably the most cost effective choice.

The approach taken herein builds upon basic principles to obtain the optimization criteria.

Governing Equations

In this section the equations describing the rigid body motion of the disk drive are derived. These equations are then used to obtain the conditions under which there is no actuator motion with an imbalanced spindle.

Three assumptions are made:
1. The rigid body modes of the drive structure on its isolation system are significantly lower in frequency than the flexible modes of the structure.
2. The spindle rotation frequency is below that of the flexible modes of the structure.
3. Only in-plane (x - y) motion of the system is considered. The extension to include out of plane motion is straightforward, but is unnecessary unless flexible-body modes are important.

The in-plane motion of a disk drive on its isolation system is governed by the system of ordinary differential equations $$M\ddot{u}(t) + Ku(t) = f(t), \quad (1)$$

where $$M = \begin{bmatrix} m & 0 & 0 \\ 0 & m & 0 \\ 0 & 0 & I_{zz} \end{bmatrix}$$

is the mass matrix, with m being the mass of the drive and $I_{zz}$ being its moment of inertia calculated about the center of gravity. The stiffness matrix is:

$$K = \begin{bmatrix} k_{11} & k_{12} & k_{13} \\ k_{12} & k_{22} & k_{23} \\ k_{13} & k_{23} & k_{33} \end{bmatrix}$$

The displacement vector with respect to an equilibrium position is:

$$u = \begin{bmatrix} u_x \\ u_y \\ u_\theta \end{bmatrix}$$

and the applied forces and moment acting on the center of gravity are:

$$f = \begin{bmatrix} F_x \\ F_y \\ M_\theta \end{bmatrix}$$

The components in the stiffness matrix are given by:

$$k_{11} = \sum_{j=1}^{n} k_{xj} \quad (2)$$

$$k_{12} = 0$$

$$k_{22} = \sum_{j=1}^{n} k_{yj}$$

$$k_{13} = -\sum_{j=1}^{n} k_{xyj} y_j$$

$$k_{23} = \sum_{j=1}^{n} k_{xyj} x_j$$

-continued $$k_{33} = \sum_{j=1}^{n} (k_{xj} y_j^2 + k_{yj} x_j^2)$$

where $K_{xj}$, $K_{yj}$ and $K_{xyj}$ are respectively the x- and y - direction and cross axis stiffness of isolator j. When the principal stiffness's of the isolators are aligned with the (x,y) coordinate system, the cross axis stiffness's are all zero, and $K_{12} = 0$. In designs where the isolator stiffness's are not aligned with the coordinate system, the isolators are typically mounted in a symmetric pattern, and the cross axis stiffness's cancel out leading to $K_{12} = 0$. For these reasons, in much of the ensuing discussion it will be assumed that $$k_{12} = 0. \quad (3)$$

Taking the Laplace transform of equation I, the result is:

$$[Ms^2 + K]u(s) = f(s), \quad (4)$$

where
s = iω, and
i = √−1. If the frequency at which this equation is solved is not a resonant frequency of the system, the matrix on the left hand side of equation 4 is invertible and the displacement u(s) can be obtained. Since it is good design practice to not place any of the rigid body resonances at the spindle rotational frequency, the matrix should be invertible at this frequency.

Letting $A(s) = [Ms^2 + K]$, and $B(s) = A^{-1}(s)$, then using equation 4 we obtain $$u(s) = B(s)f(s). \quad (5)$$

The objective is to find the conditions under which the rotational displacement is zero when a spindle imbalance is present. Stated in terms of the variables in equation 5, this is $$u_\theta(s = i\omega_r) = b_{13}F_x + b_{23}F_y + b_{33}M_\theta \quad (6)$$
$$= 0,$$

where
$\omega_r$ is the rotational frequency of the spindle in radians per second.

The $b_{ij}$ coefficients in the above equation are found by inverting A, producing $$b_{13} = \frac{1}{det(A)} (k_{12}k_{23} - k_{13}(k_{22} + s^2 m)), \quad (7)$$

$$b_{23} = \frac{1}{det(A)} (k_{12}k_{13} - k_{23}(k_{22} + s^2 m)),$$

$$b_{33} = \frac{1}{det(A)} ((k_{11} + s^2 m)(k_{22} + s^2 m) - k_{12}^2).$$

For these to be bounded, the determinant of A must be nonzero. These expressions are therefore not valid at the natural frequencies of the base casting/isolation system.

When calculating the forces due to a spindle imbalance, the terms in f(s) become the forces applied by the spindle to the center of gravity. The x direction component is given by $$F_x = F \cos \omega_r t, \quad (8)$$

where for convenience the initial phase is chosen to be zero. The y direction component will be ninety degrees out of phase with respect to $F_y$, but whether it leads or lags depends on the direction of rotation of the spindle. Thus, $$F_y = \pm F \sin \omega_r t. \quad (9)$$

This sign ambiguity will not have an effect on the final result, but is included here for completeness. When the moment $M_\theta$ is calculated, only the forces due to the mass imbalance are included. The cogging torque, if significant, normally appears at a multiple of the rotational frequency, and is not of interest in this analysis. Therefore $$\begin{aligned} M_\theta &= -F_x y_s + F_y x_s \\ &= F[\pm x_s \sin \omega_r t - y_s \cos \omega_r t], \end{aligned} \quad (10)$$

where
($x_s$, $y_s$) is the position of the spindle in a coordinate system having an origin at the center of gravity of the drive.

Equation 6 relates the rotational motion to the applied forces. When equations 8, 9 and 10 are substituted into equation 6, the result is an equation of the form:

$$(b_{13} - y_s b_{33}) \sin \omega_r t \pm (b_{23} + x_s b_{33}) \cos \omega_r t = 0. \quad (11)$$

For this equation to be satisfied at arbitrary times, the coefficients of both the sine and cosine terms must be zero. Thus, after substituting for the $b_{ij}$ coefficients found in equation 7, one obtains:

$$(k_{12}k_{13} - k_{13}(k_{22} - \omega_r^2 m)) - y_s((k_{11} - \omega_r^2 m)(k_{22} - \omega_r^2 m) - k_{12}^2) = 0,$$

$$(k_{12}k_{13} - k_{23}(k_{11} - \omega_r^2 m)) + x_s((k_{11} - \omega_r^2 m)(k_{22} - \omega_r^2 m) - k_{12}^2) = 0. \quad (12)$$

The sign ambiguity of the force is no longer present because the coefficients of the sine and cosine terms are considered separately. The above terms are further simplified if, from equation 3, $k_{12} = 0$, resulting in:

$$[k_{22} - \omega_r^2 m][k_{13} + y_s(k_{11} - \omega_r^2 m)] = 0,$$

$$[k_{11} - \omega_r^2 m][k_{23} - x_s(k_{22} - \omega_r^2 m)] = 0. \quad (13)$$

These equations are satisfied if either one of the bracketed expressions are made equal to zero. However, to give the designer latitude in isolating the drive, it is best to allow $k_{11}$ and $k_{22}$ to be set arbitrarily, with the second bracketed term in the equations set to zero. This leaves $$k_{13} + y_s(k_{11} - \omega_r^2 m) = 0,$$

$$k_{23} - x_s(k_{22} - \omega_r^2 m) = 0. \quad (14)$$

These expressions, upon substitution from equation 2 and equation 3, lead to a set of five simultaneous expressions that must be satisfied by the individual isolators. These are:

$$\sum_{j=1}^{n} k_{xj} = k_{11}, \quad (15)$$

$$\sum_{j=1}^{n} k_{yj} = k_{22},$$

$$\sum_{j=1}^{n} (k_{xj} p_j - k_{xj} x_j) = y_s(k_{11} - \omega_r^2 m),$$

$$\sum_{j=1}^{n} (k_{yj} x_j - k_{xyj} p_j) = x_s(k_{22} - \omega_r^2 m).$$

$$\sum_{j=1}^{n} k_{xyj} = 0$$

The above expressions allow for $k_{11}$ and $k_{22}$ to be set by the designer. However, due to physical and practical constraints on the isolators (positive stiffness, values must be within manufacturable range, etc.), it is best to vary the two system stiffness's to find suitable ranges for the positions and/or stiffness's of the individual isolators.

The above relations lead directly to a set of linear equations in terms of the stiffness's and/or positions of the isolators that need to be satisfied so that imbalances in the spindle do not cause off track motion of the actuator. This is further explored below for the particular case of isotropic isolators.

Isotropic Isolators

Many commercially available isolators are designed to be isotropic; that is $k_{xj} = k_{yj} = k_j$ and $k_{xyj} = 0$. For these, equation 15 can be rewritten as $$\sum_{j=1}^{n} k_j = k_{11} = k_{22} = \kappa, \quad (16)$$

$$\sum_{j=1}^{n} k_j p_j = y_s(\kappa - \omega_r^2 m),$$

$$\sum_{j=1}^{n} k_j x_j = x_s(\kappa - \omega_r^2 m).$$

In comparing equation 15 and equation 16 one can see that the isotropy assumption has halved the number of undetermined isolator stiffness's and reduced the number of constraint equations by one. Equation 16 is now used to investigate various tuning methods to reduce the effect of spindle imbalances.

Embodiment 1: Fix Isolator Locations and Vary Their Stiffness's

In this embodiment, the isolator positions are assumed to be fixed, while the isolator stiffness's are adjusted. This technique is applicable to both drives in development as well as those having a structure which is already fixed, and onto which a different set of isolators are retro-fitted.

Equation 16 can be rewritten in matrix notation as:

$$\begin{bmatrix} 1 & 1 & 1 & \cdots & 1 \\ x_1 & x_2 & x_3 & \cdots & x_n \\ y_1 & y_2 & y_3 & \cdots & y_n \end{bmatrix} \begin{bmatrix} k_1 \\ k_2 \\ k_3 \\ \cdot \\ \cdot \\ \cdot \\ k_n \end{bmatrix} = \begin{bmatrix} \kappa \\ x_s(\kappa - \omega_r^2 m) \\ y_s(\kappa - \omega_r^2 m) \end{bmatrix}. \quad (17)$$

Thus, given the isolator locations $(x_j, y_j)$, the sum of isolator stiffness $\kappa$, the relationship between the center of mass and the spindle center $(x_s, y_s)$, system mass m, and spindle rotational frequency $\omega_r$, equation (17) gives an expression that must be satisfied by the isolator stiffness's $k_j$.

Subcase a: Three Isolators (n=3)

If n=3, equation (17) has a unique solution, ignoring the degenerate case where two or more isolators are placed at the same location. The solutions tier $k_1$, $k_2$ and $k_3$ must meet the physical condition that all isolator stiffness's be positive, as well as the requirement that none of the modes lies at the rotational frequency of the spindle. If either of these is violated, the designer should consider either altering the locations of the isolators or increasing the number of isolators in the design.

EXAMPLE 1

Figure 2:
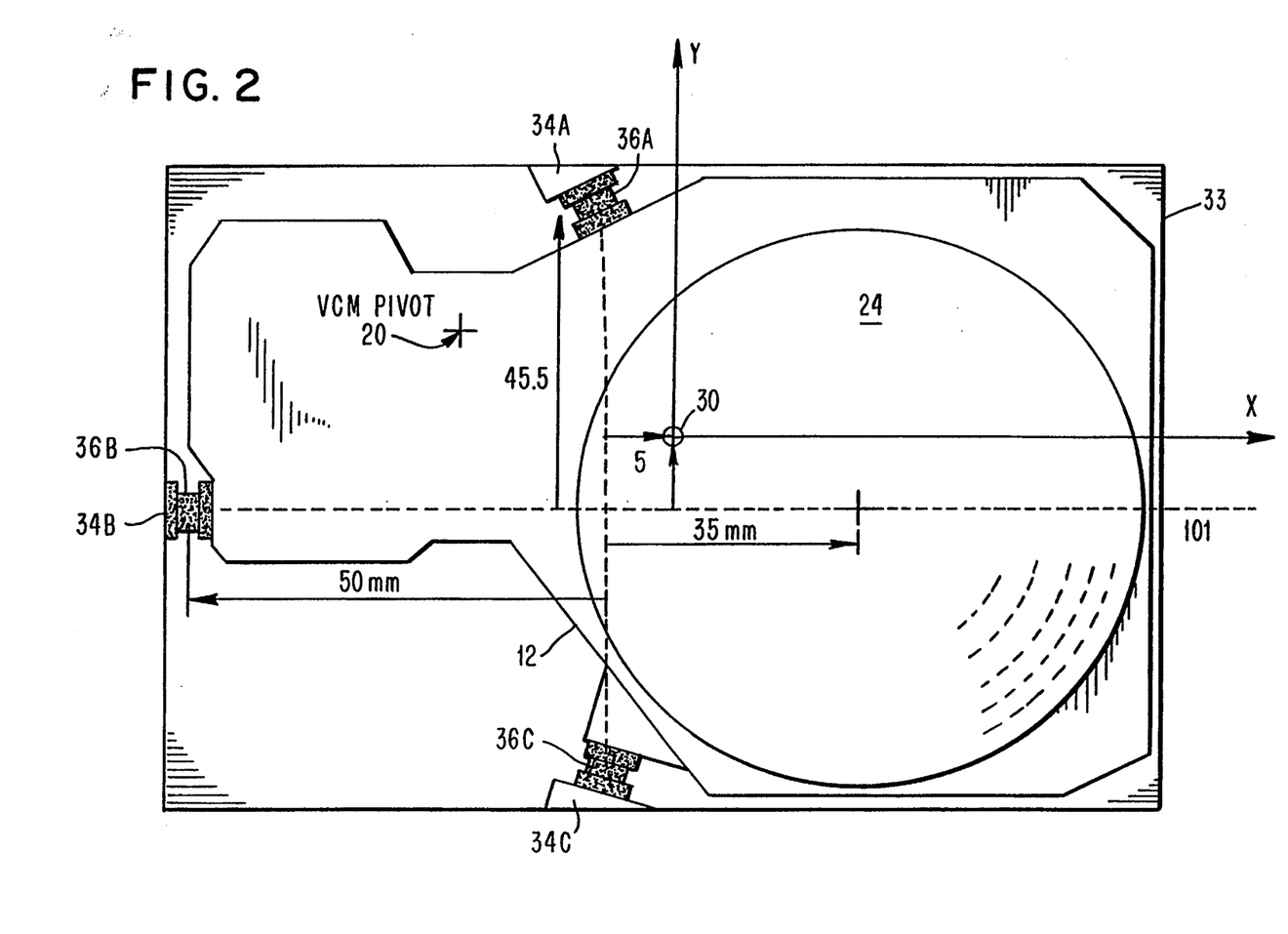
FIG. 2 illustrates the mounting arrangements for a typical rotary drive.

The shock and isolation system for a typical drive uses a set of three isolators laid out as shown in the schematic of FIG. 2. An enclosure 33 has isolator mounting planes 34A, 34B and 34C which are parallel to corresponding surfaces of housing 12. Between these planes and the surfaces of the housing are isolators 36A, 36B and 36C, respectively. Although the drive was not designed to use isotropic isolators, the calculation below proposes a configuration using isotropic isolators to decouple the rotating imbalance from the actuator motion. The parameters for the drive are listed below:

m=0.573 kg,
$\omega$hd r=72 hz=452 radians/sec,
$x_s$=30 mm, $y_s$=−5 mm,
$x_1$=−5 mm, $y_1$=40.5 mm,
$x_2$=−55 mm, $y_2$=−5 mm,
$x_3$=−5 mm, $y_3$=−50.5 mm, Substitution of these values into equation 17 leads to the matrix system:

$$\begin{bmatrix} 1 & 1 & 1 \\ -5 & -55 & -5 \\ 40.5 & -5 & -50.5 \end{bmatrix} \begin{bmatrix} k_1 \\ k_2 \\ k_3 \end{bmatrix} = \begin{bmatrix} \kappa \\ 30(\kappa - 1.17 \times 10^5) \\ -5(\kappa - 1.17 \times 10^5) \end{bmatrix}.$$

By varying the value of $\kappa$ in the above expression, one arrives at a family of values for the two stiffness's. Over much of the range as $\kappa$ varies from zero to infinity, the stiffness's are not practical for design. However, when the $\kappa$ is chosen so that $\sqrt{\kappa/m}$ is slightly below the rotational speed, the stiffness's reach reasonable values. By numerical experimentation, it is found that when $\kappa$ is set to $64 \times 10^3$ N/m, the resulting stiffness's lead to a design in which two of the isolators have the same stiffness, while the third has half the stiffness of the first two. The values are:

$k_1 = 25.7 \times 10^3$ N/m, $k_2 = 25.4 \times 10^3$ N/m, $k_3 = 12.8 \times 10^3$ N/m The above values are approximately an order of magnitude below the stiffness's typically used in a product. This is because conventional mounts for the drive serve primarily for shock reduction, and are excessively stiff for external vibration isolation. However, as the track densities are increased the isolation function of the mounts must be enhanced, and the above values are a possible choice.

Subcase b: Four or More Isolators (n>3)

If the number of isolators is greater than three, then there is no unique solution to equation 17. The designer can then either add further equations (such as forcing two isolators to have the same stiffness), or can use a generalized inverse to solve the problem.

Embodiment 2: Fix Isolator Stiffness's But Optimally Locate The Isolators

This approach is probably the most suited for a drive in the early stages of development, since it permits the designer the greatest latitude with respect to the choice of isolators. In this technique, the isolator stiffness's are first chosen, and the equations derived here are then used to optimally position the isolators.

In most designs, the isolators are limited to the perimeter of the drive. This provides some additional constraint equations that are used, with equation 16. If the drive is rectangular, then the constraints are of the form $x = x_{min}$ or $x_{max}$ and $y = y_{min}$ or $y_{max}$.

For this case the design procedure would be as follows:

1. Determine a total stiffness $\kappa$ desired for the isolation system.
2. Choose how many isolators to place along each edge. Using four isolators with one along each edge $(x_1 = x_{min}, x_3 = x_{max}, y_2 = y_{min}, y_4 = y_{max})$, and using equation 16, the following equation should be satisfied by the remaining coordinates:

$$\begin{bmatrix} 0 & k_2 & 0 & k_4 \\ k_1 & 0 & k_3 & 0 \end{bmatrix} \begin{bmatrix} y_1 \\ x_2 \\ y_3 \\ x_4 \end{bmatrix} = \begin{bmatrix} x_s(\kappa - \omega_r^2 m) - k_1 x_{min} - k_3 x_{max} \\ y_s(\kappa - \omega_r^2 m) - k_2 y_{min} - k_4 y_{max} \end{bmatrix}. \quad (18)$$

As was true for subcase b of the previous approach, there are more unknowns than equations. Thus there are may possible solutions. This gives the designer some latitude in the positioning of the isolators.

3. Check that the solution satisfies the geometric constraints. For a rectangular drive, these are simply $x_{min} \leq x_j \leq x_{max}$, $y_{min} \leq y_j \leq y_{max}$. \quad (19)

Embodiment 3: Shifting The Center Of Gravity Of The Drive

In the previous two approaches the rotation of the drive due to a spindle imbalance was canceled by modifying the stiffness matrix of the system. This third method achieves the same goal by modifying the mass matrix by attaching a mass to the base structure. Let the attached mass have the following properties: mass $m_b$, moment of inertia $I_b$, and center of gravity coordinates $(x_b, y_b)$ with respect to the original center of gravity. The new mass matrix is given by:

$$M = \begin{bmatrix} m_t & 0 & m_b y_b \\ 0 & m_t & -m_b x_b \\ m_b y_b & -m_b x_b & I_t \end{bmatrix}, \quad (20)$$

where
$I_t = I_{zz} + I_b + m_b(x_b^2 + y_b^2)$ and $m_t = m + m_b$. Then, taking advantage of $k_{12} = 0$, $$[Ms^2 + K] = \begin{bmatrix} m_t s^2 + k_{11} & 0 & m_b y_b s^2 + k_{13} \\ 0 & m_t s^2 + k_{22} & -m_b x_b s^2 + k_{23} \\ m_b y_b s^2 + k_{13} & -m_b x_b s^2 + k_{23} & I_t s^2 + k_{33} \end{bmatrix}, \quad (21)$$

The above expression does not include the isotropy assumption used earlier as it does not help in simplifying the solution.

The components needed by equation (6) are found by inverting the above matrix, resulting in $$b_{13} = \frac{-1}{det(A)} [(m_t s^2 + k_{22})(m_b y_b s^2 + k_{13})], \quad (22)$$

$$b_{23} = \frac{-1}{det(A)} [(m_t s^2 + k_{11})(-m_b x_b s^2 + k_{23})],$$

$$b_{33} = \frac{-1}{det(A)} [(m_t s^2 + k_{11})(m_t s^2 + k_{22})],$$

where
$A = [Ms^2 + K]$.

Figure 3:
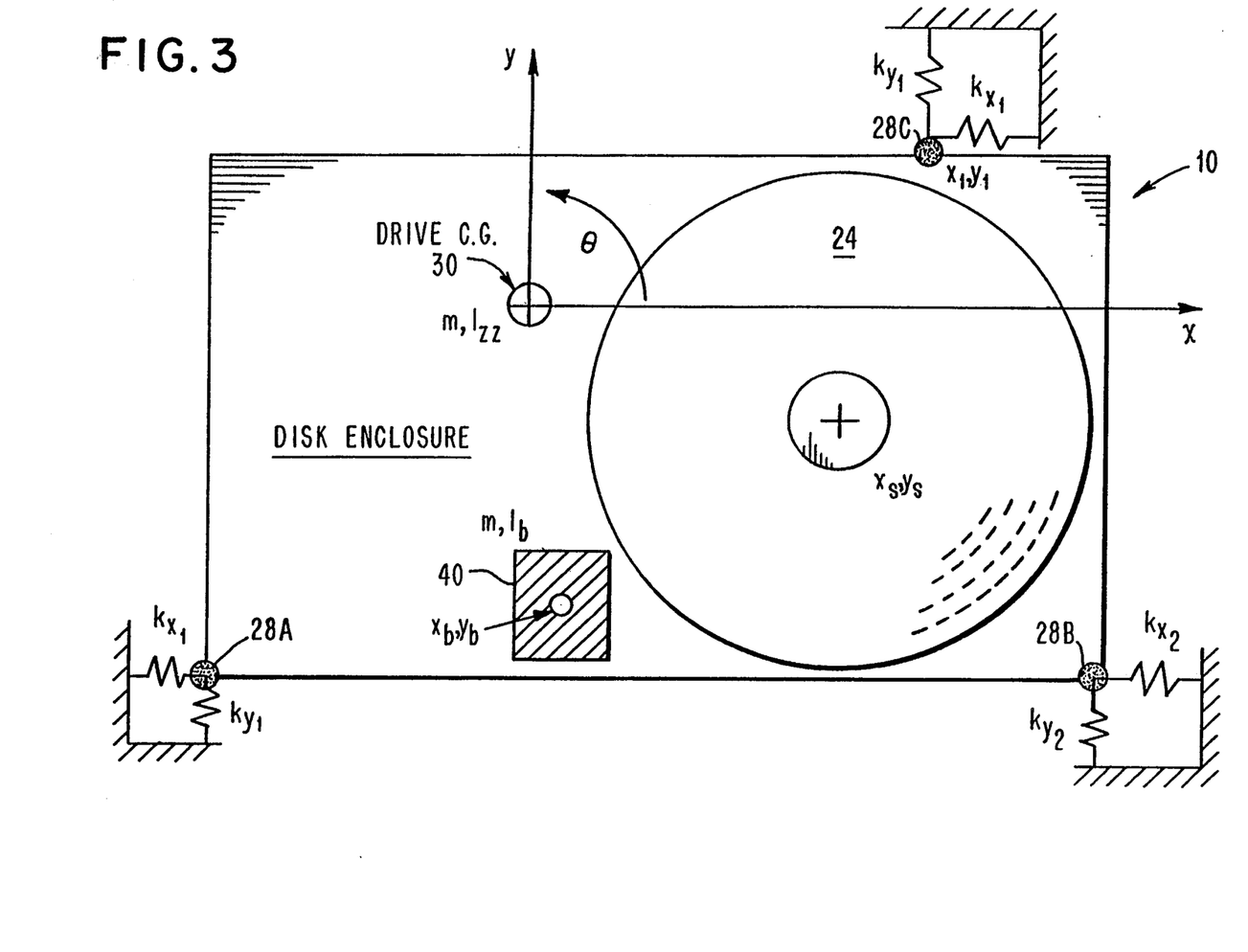
FIG. 3 illustrates a rotary drive to which a balancing mass has been added.

Substitution from equations 8, 9, 10 and 22 into equation 6 leads to the following pair of equations, where at the spindle rotation frequency $s = i\omega_r$ $(k_{22} - m_t\omega_r^2)[(k_{13} - m_b y_b\omega_r^2) + y_s(k_{11} - m_t\omega_r^2)] = 0,$ $(k_{11} - m_t\omega_r^2)[(-k_{23} - m_b x_b\omega_r^2) + x_s(k_{22} - m_t\omega_r^2)] = 0. \quad (23)$ If, as in the previous case, $k_{11}$ and $k_{22}$ are arbitrarily chosen, then these equations reduce to:

$(k_{13} - m_b y_b\omega_r^2) + y_s(k_{11} - m_t\omega_r^2) = 0,$ $(-k_{23} - m_b x_b\omega_r^2) + x_s(k_{22} - m_t\omega_r^2) = 0. \quad (24)$ Since there are more unknowns ($m_b$, $x_b$, $y_b$) than equations, the recommended design procedure is the following:

1. Arbitrarily select $m_b$
2. The location at which to attach the mass 40 is then, from equation 24:

$$x_b = \frac{-k_{23} + x_s(k_{22} - m_t\omega_r^2)}{m_b\omega_r^2} \quad (25)$$

-continued
$$y_b = \frac{k_{13} + y_s(k_{11} - m_t\omega_r^2)}{m_b\omega_r^2}$$

3. If $(x_b, y_b)$ is located outside the perimeter or the casting, or so small as to make accurate location difficult, then alter $m_b$ and recalculate by using equation 25.

Effect Of Damping

Damping is introduced into the system by the isolators and is typically below 10% of critical damping but may vary from zero to substantially thirty percent. Since all of the isolators in a particular drive are typically made of a single material, and the ratio of stiffness to damping is a material property, the damping matrix is modeled as being proportional to the stiffness matrix. Letting $$C = \alpha K, \quad (26)$$

the equation of motion is, in Laplace transform form:

$$[Ms^2 + K(\alpha s + 1)]u(s) = f(s). \quad (27)$$

After inversion, the coefficients of interest are $$b_{13} = \frac{1}{det(A)} (\hat{k}_{12}\hat{k}_{23} - \hat{k}_{13}(\hat{k}_{22} + s^2 m)), \quad (28)$$

$$b_{23} = \frac{1}{det(A)} (\hat{k}_{12}\hat{k}_{13} - \hat{k}_{23}(\hat{k}_{22} + s^2 m)),$$

$$b_{33} = \frac{1}{det(A)} ((\hat{k}_{11} + s^2 m)(\hat{k}_{22} + s^2 m) - \hat{k}_{12}^2),$$

where $\hat{k}_{ij} = k_{ij}(1 + \alpha s), A = [Ms^2 + K(\alpha s + 1)].$

From here on, the development of the constraints that must be satisfied to produce zero rotation very closely parallels the undamped case. Since the clamping ratio is typically low, the constraints for the undamped system are adequate for designing most systems, and the equations for the damped system will not be developed further, but can be by one skilled in the art.

While the invention has been described in connection with specific embodiments, it will be understood that those skilled in the art may be able to develop variations of the disclosed embodiments without departing from the spirit of the invention or the scope of the following claims:

We claim:

1. A direct access storage device apparatus comprising:
   a housing;
   a spindle mounted for rotation at a predetermined frequency in said housing at a predetermined location, said spindle producing periodic sinusoidal vibration at said predetermined frequency;
   a disk mounted on said spindle;
   an actuator pivotally mounted in said housing, said actuator having an end extending over said disk;
   a head mounted at the end of said actuator for interaction with said disk;
   an enclosure for said housing;
   n vibration isolation mounts located between the device and the enclosure, said vibration isolation mounts having stiffness characteristics and being positioned so that rotational motion of the device at the frequency of the rotary motion is eliminated, thus preventing periodic sinusoidal vibrations produced by rotation of the spindle from causing rotational motion of the device so as to change the position of said head with respect to said disk.

2. The apparatus according to claim 1 wherein said rotary motion produces linear and rotational forces and wherein the vibration isolation mounts are arranged and configured so that a net moment of all forces about the center of gravity of the device is equal to zero.

3. The apparatus of claim 1 wherein the following relationships are satisfied:

$$\sum_{j=1}^{n} k_{xj} = k_{11},$$

$$\sum_{j=1}^{n} k_{yj} = k_{22},$$

$$\sum_{j=1}^{n} (k_{xj}y_j - k_{xj}x_j) = y_s(k_{11} - \omega_r^2 m),$$

$$\sum_{j=1}^{n} (k_{yj}x_j - k_{xyj}y_j) = x_s(k_{22} - \omega_r^2 m).$$

$$\sum_{j=1}^{n} k_{xyj} = 0.$$

4. The apparatus of claim 1 wherein the vibration isolation mounts are isotropic.

5. The apparatus of claim 1 wherein at least two vibration isolation mounts have different stiffnesses.

6. The apparatus of claim 5 wherein the following relationships are satisfied.

$$\sum_{j=1}^{n} k_j = k_{11} = k_{22} = \kappa,$$

$$\sum_{j=1}^{n} k_j y_j = y_s(\kappa - \omega_r^2 m),$$

$$\sum_{j=1}^{n} k_j x_j = x_s(\kappa - \omega_r^2 m).$$

7. The apparatus of claim 6 wherein n is equal to 3.

8. The apparatus of claim 6 wherein n is greater than 3.

9. The apparatus of claim 6 wherein all of the vibration isolation mounts have the same stiffnesses.

10. The apparatus of claim 9 wherein the following relationship is satisfied:

$$\begin{bmatrix} 0 & k_2 & 0 & k_4 \\ k_1 & 0 & k_3 & 0 \end{bmatrix} \begin{bmatrix} y_1 \\ x_2 \\ y_3 \\ x_4 \end{bmatrix} = \begin{bmatrix} x_s(\kappa - \omega_r^2 m) - k_1 x_{min} - k_3 x_{max} \\ y_s(\kappa - \omega_r^2 m) - k_2 y_{min} - k_4 y_{max} \end{bmatrix}.$$

11. The apparatus of claim 1 further comprising an additional mass which is added to change the location of the center of gravity of the device.

12. The apparatus of claim 11 wherein the mass is placed so that the center of gravity of the mass is at a point defined by:

$$x_b = \frac{-k_{23} + x_s(k_{22} - m_t \omega_r^2)}{m_b \omega_r^2};$$

and $$y_b = \frac{k_{13} + y_s(k_{11} - m_t \omega_r^2)}{m_b \omega_r^2}.$$

13. The apparatus of claim 1 wherein the vibration isolation mounts are comprised of a material which provides damping of approximately zero to substantially thirty percent of critical damping.

14. The apparatus of claim 1 wherein said enclosure is a user frame of a computer.

15. The apparatus of claim 14 further comprising in combination the computer in which said user frame is disposed.

16. The direct access storage device of claim 1 wherein the spindle is located on said device remote from the center of gravity of said device.

17. In a direct access storage device including a housing; a spindle mounted for rotation at a predetermined frequency in said housing at a predetermined location, said spindle producing periodic sinusoidal vibration at said predetermined frequency; a disk mounted on said spindle; an actuator pivotally mounted in said housing, said actuator having an end extending over said disk; a head mounted at an end of said actuator for interaction with said disk; and an enclosure for said housing; the method comprising: providing n vibration isolation mounts between the device and the enclosure, said vibration isolation mounts having stiffness characteristics and being positioned so that rotational motion of the device at the frequency of the rotary motion is eliminated, thus preventing periodic sinusoidal vibrations produced by rotation of the spindle from causing rotational motion of the device so as to change the position of said head with respect to said disk.

18. The method according to claim 17 wherein said rotary motion produces linear and rotational forces and wherein the vibration isolation mounts are arranged and configured so that a net moment of all Forces about the center of gravity of the device is equal to zero.

19. The method of claim 17 wherein the following relationships are satisfied:

$$\sum_{j=1}^{n} k_{xj} = k_{11},$$

$$\sum_{j=1}^{n} k_{yj} = k_{22},$$

$$\sum_{j=1}^{n} (k_{xj}y_j - k_{xj}x_j) = y_s(k_{11} - \omega_r^2 m),$$

$$\sum_{j=1}^{n} (k_{yj}x_j - k_{xyj}y_j) = x_s(k_{22} - \omega_r^2 m).$$

$$\sum_{j=1}^{n} k_{xyj} = 0.$$

20. The method of claim 19 wherein the following relationships are satisfied:

$$\sum_{j=1}^{n} k_j = k_{11} = k_{22} = \kappa,$$

-continued $$\sum_{j=1}^{n} k_j y_j = y_s(\kappa - \omega_r^2 m),$$

$$\sum_{j=1}^{n} k_j x_j = x_s(\kappa - \omega_r^2 m).$$

21. The method of claim 20 wherein n is selected to be equal to 3.

22. The method of claim 20 wherein n is selected to be greater than 3.

23. The method of claim 20 wherein the vibration isolation mounts are selected to all have the same stiffnesses.

24. The method of claim 20 wherein the following relationship is satisfied:

$$\begin{bmatrix} 0 & k_2 & 0 & k_4 \\ k_1 & 0 & k_3 & 0 \end{bmatrix} \begin{bmatrix} y_1 \\ x_2 \\ y_3 \\ x_4 \end{bmatrix} = \begin{bmatrix} x_s(\kappa - \omega_r^2 m) - k_1 x_{min} - k_3 x_{max} \\ y_s(\kappa - \omega_r^2 m) - k_2 y_{min} - k_4 y_{max} \end{bmatrix}$$

25. The method of claim 17 further comprising selecting the vibration isolation mounts to be isotropic.

26. The method of claim 17 further comprising selecting the vibration isolation mounts so that at least two have different stiffnesses.

27. The method of claim 17 further comprising adding an additional mass to change the location of the center of gravity of the device.

28. The method of claim 27 wherein the mass is placed so that the center of gravity of the mass is at a point defined by:

$$x_b = \frac{-k_{23} + x_s(k_{22} - m_t \omega_r^2)}{m_b \omega_r^2};$$

and $$y_b = \frac{k_{13} + y_s(k_{11} - m_t \omega_r^2)}{m_b \omega_r^2}.$$

29. The apparatus of claim 17 wherein the vibration isolation mounts are comprised of a material which provides damping of zero to substantially thirty percent of critical damping.

30. The method of claim 17 wherein enclosure is the user frame of a computer which receives said direct access storage device.

31. The method of claim 17 wherein the spindle is located on said device remote from the center of gravity of said device.

* * * * *